US008834166B1

(12) United States Patent
Ionkov et al.

(10) Patent No.: US 8,834,166 B1
(45) Date of Patent: Sep. 16, 2014

(54) USER DEVICE PROVIDING ELECTRONIC PUBLICATIONS WITH DYNAMIC EXERCISES

(75) Inventors: George M. Ionkov, Seattle, WA (US); Dennis H. Harding, Seattle, WA (US); Aaron James Dykstra, Seattle, WA (US); Laura Ellen Grit, Seattle, WA (US); James C. Petts, Seattle, WA (US); Samuel A. Minter, Seattle, WA (US); Lindsey Christina Fowler, Seattle, WA (US); Yong Xi, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 815 days.

(21) Appl. No.: 12/890,532

(22) Filed: Sep. 24, 2010

(51) Int. Cl.
*G09B 17/00* (2006.01)
(52) U.S. Cl.
USPC .......................................... 434/178; 434/179
(58) Field of Classification Search
USPC ................ 434/178, 179, 262, 189, 184
See application file for complete search history.

(56) References Cited

U.S. PATENT DOCUMENTS

| 5,256,067 | A | * | 10/1993 | Gildea et al. | 434/169 |
|---|---|---|---|---|---|
| 5,876,334 | A | * | 3/1999 | Levy | 600/300 |
| 5,957,699 | A | * | 9/1999 | Peterson et al. | 434/350 |
| 6,086,382 | A | * | 7/2000 | Thomas | 434/323 |
| 6,361,322 | B1 | * | 3/2002 | Linden Henry | 434/178 |
| 6,409,513 | B1 | * | 6/2002 | Kawamura et al. | 434/178 |
| 6,561,812 | B1 | * | 5/2003 | Burmester et al. | 434/365 |
| 6,869,287 | B1 | * | 3/2005 | Tadlock et al. | 434/178 |
| 7,114,126 | B2 | * | 9/2006 | Berger et al. | 715/750 |
| 7,286,793 | B1 | * | 10/2007 | Miele | 434/362 |
| 7,293,025 | B1 | * | 11/2007 | Harouche | 1/1 |
| 7,455,522 | B2 | * | 11/2008 | Polanyi et al. | 434/178 |
| 7,568,160 | B2 | * | 7/2009 | Berger et al. | 715/750 |
| 2003/0017442 | A1 | * | 1/2003 | Tudor et al. | 434/322 |
| 2003/0027122 | A1 | * | 2/2003 | Stansvik | 434/323 |
| 2003/0068603 | A1 | * | 4/2003 | Cupp | 434/178 |
| 2003/0227479 | A1 | * | 12/2003 | Mizrahi et al. | 345/753 |
| 2004/0067472 | A1 | * | 4/2004 | Polanyi et al. | 434/178 |
| 2004/0110120 | A1 | * | 6/2004 | Ho et al. | 434/350 |
| 2004/0219502 | A1 | * | 11/2004 | Bechard et al. | 434/322 |
| 2006/0008781 | A1 | * | 1/2006 | Townshend et al. | 434/178 |
| 2006/0063139 | A1 | * | 3/2006 | Carver et al. | 434/178 |
| 2006/0084047 | A1 | * | 4/2006 | Chiu et al. | 434/320 |
| 2007/0238077 | A1 | * | 10/2007 | Strachar | 434/178 |
| 2007/0269788 | A1 | * | 11/2007 | Flowers et al. | 434/350 |
| 2008/0096171 | A1 | * | 4/2008 | Movahhedi | 434/178 |
| 2008/0108029 | A1 | * | 5/2008 | Luke et al. | 434/178 |
| 2008/0138787 | A1 | * | 6/2008 | Weinstein | 434/362 |
| 2012/0231441 | A1 | * | 9/2012 | Parthasarathy et al. | 434/362 |

\* cited by examiner

*Primary Examiner* — Robert J Utama
(74) *Attorney, Agent, or Firm* — Lowenstein Sandler LLP

(57) ABSTRACT

A user device displays portions of an electronic publication for a user to read. The user device tracks the user's reading behavior of the portions of the electronic publication. The user device then selects a problem from a group of pre-generated problems for the user based on the user's reading behavior and provides the selected problem to the user.

25 Claims, 6 Drawing Sheets

US 8,834,166 B1

USER DEVICE PROVIDING ELECTRONIC PUBLICATIONS WITH DYNAMIC EXERCISES

BACKGROUND OF THE INVENTION

A large and growing population of users enjoy entertainment through the consumption of media items, such as electronic books (also referred to herein as ebooks), electronic newspapers, electronic magazines, and other electronic reading material. Users employ various electronic devices to consume such publications. Among these electronic devices are electronic book readers, cellular telephones, personal digital assistants (PDAs), portable media players, tablet computers, electronic pads, netbooks, desktop computers, notebook computers, and the like. Electronic textbooks may also be offered for electronic devices. Currently, most electronic textbooks do not offer additional functionality over that provided by traditional textbooks. Some additional functionality that may be added to electronic textbooks is provided in the detailed description of this application.

BRIEF DESCRIPTION OF THE DRAWINGS

The embodiments described herein will be understood more fully from the detailed description given below and from the accompanying drawings, which, however, should not be taken to limit the application to the specific embodiments, but are for explanation and understanding only.

DETAILED DESCRIPTION OF THE PRESENT INVENTION

Methods and systems for enabling a user device to dynamically select problems for a user based on the user's behavior are described herein. In one embodiment, a user device displays portions of an electronic publication for a user to read. The user device tracks the user's reading behavior of the portions of the electronic publication. This may include tracking user eye movement by a sensor, tracking the speed at which the user changes pages, tracking how many pages the user reads, and so on. The user device then selects a problem from a group of pre-generated problems for the user based on the user's reading behavior. In one embodiment, the problem that is selected tests material covered by one or more of the displayed portions of the electronic publication that the user appeared to have the most difficulty understanding based on the user's reading behavior. The user device then provides the selected problem to the user.

Figure 1:
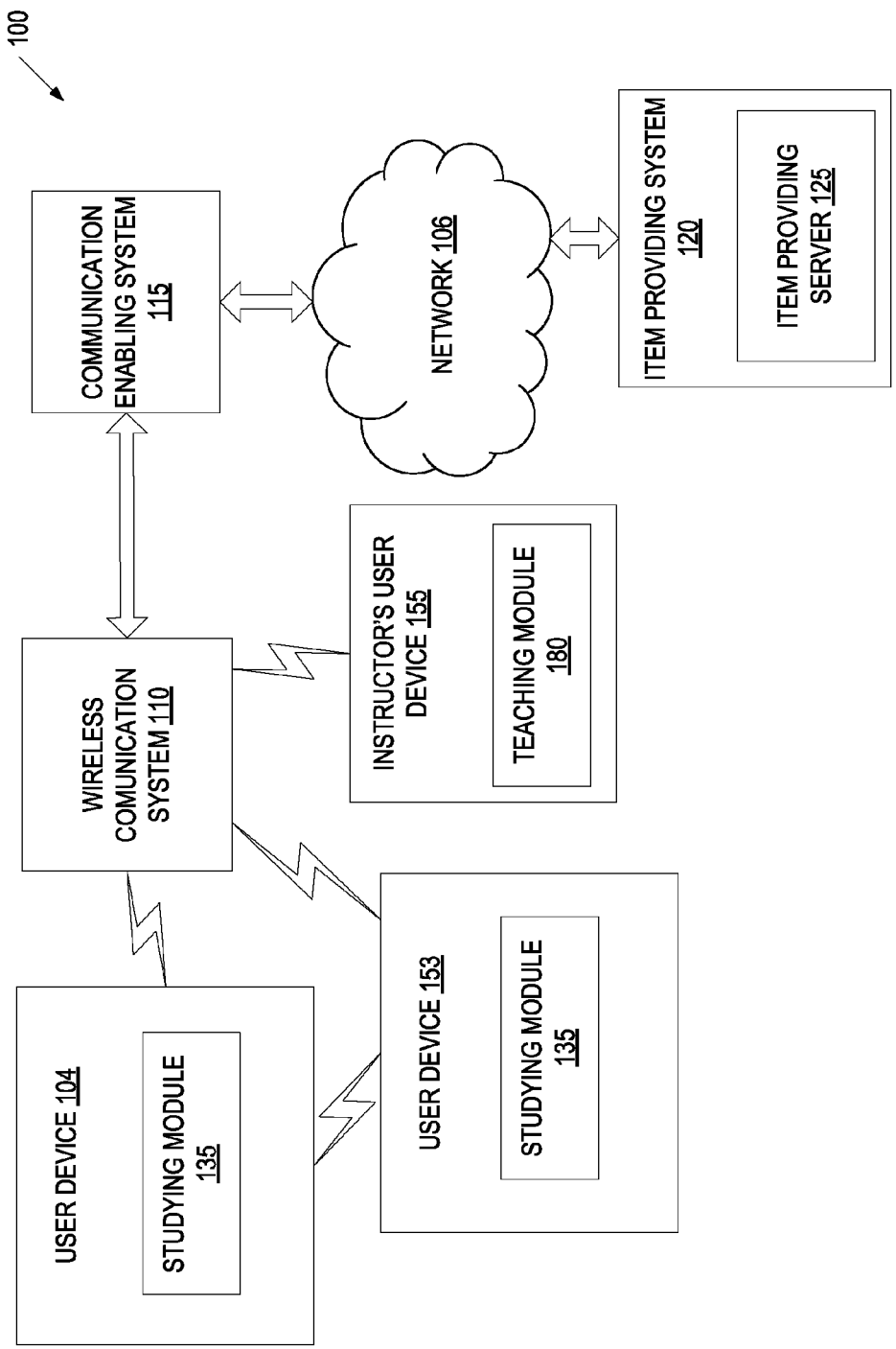
FIG. 1 is a block diagram of an exemplary network architecture, in which embodiments of the present invention may operate.

FIG. 1 is a block diagram of an exemplary network architecture 100, in which embodiments described herein may operate. The network architecture 100 may include an item providing system 120 and one or more user devices 104, 153, 155 capable of communicating with the item providing system 120 via a network 106 (e.g., a public network such as the Internet or a private network such as a local area network (LAN)).

The user devices 104, 153, 155 may be portable computing devices such as electronic book readers or tablet computers (e.g., that include a book reader application). Other examples of portable computing devices include cellular telephones, personal digital assistants (PDAs), portable media players, netbooks, and the like. The user devices 104, 153, 155 may also be non-portable computing devices such as a desktop computer, a set-top box associated with a television, a gaming console, and so on. The user devices 104, 153, 155 are variously configured with different functionality to enable consumption of one or more types of media items. The media items may be electronic books (ebooks) such as electronic textbooks and/or other electronic publications (electronic versions of publications) such as electronic magazines, digital newspapers, digital audio books, electronic journals, real simple syndication (RSS) feeds, etc. The media items may also include digital video (e.g., movies, television, short clips, etc.), images (e.g., art, photographs, etc.), and multi-media content.

The item-providing system 120 corresponds to any functionality or combination of functionality for providing media items to the user devices 104, 153, 155. The item-providing system 120 includes a network-accessible server-based functionality (item providing server 125), various data stores (not shown), and/or other data processing equipment. The item-providing system 120 may be implemented by a single machine or a cluster of machines. The item providing system 120 may include one or more machines (e.g., one or more server computer systems, routers, gateways, etc.) that have processing and storage capabilities to provide the server-based functionality.

In one embodiment, the item providing server 125 corresponds to an entity which provides electronic publications (e.g., electronic textbooks) to users upon the users' purchase of the items. In this role, the item providing server 125 may essentially act as a bookseller or the like. In other cases, the item providing server 125 corresponds to an entity which provides electronic publications to users on a non-fee basis or on the basis of some other type of alternative compensation arrangement. Thus, the term a "provider" of items should be construed broadly to encompass educational institutions, governmental organizations, libraries, non-profit organizations, retailers, auction services, and so on, or some cooperative combination of any two or more entities.

The item providing server 125 delivers, and the user devices 104, 153, 155 receive, electronic publications (or other media items), search results, upgrades, and/or other information via the network 106. For example, the user devices 104, 153, 155 may download or receive ebooks from the item providing server 125. The item providing server 125 also receives various requests (e.g., search queries), instructions and other data from the user devices 104, 153, 155 via the network 106.

Communication between the user devices 104, 153, 155 and the item providing system 120 may be enabled via any communication infrastructure. One example of such an infrastructure includes a combination of a wide area network (WAN) and wireless infrastructure, which allows a user to use the user devices 104, 153, 155 to purchase items (e.g., electronic publications) and consume items without being tethered to the item providing system 120 via hardwired links. The wireless infrastructure may be provided by one or multiple wireless communications systems, such as wireless communications system 110. Wireless communication system 110 may be a wireless fidelity (WiFi) hotspot connected with the network 106. Wireless communication system 110 may also be a wireless carrier system that can be implemented using various data processing equipment, communication towers, etc. Alternatively, or in addition, the wireless carrier system may rely on satellite technology to exchange information with the user devices 104, 153, 155.

The communication infrastructure may also include a communication-enabling system 115 that serves as an intermediary in passing information between the item providing system 120 and the wireless communication system 110. The communication-enabling system 115 may communicate with the wireless communication system 110 (e.g., a wireless carrier) via a dedicated channel, and may communicate with the item providing system 120 via a non-dedicated communication mechanism, e.g., a public Wide Area Network (WAN) such as the Internet.

In addition to wirelessly connecting to wireless communication system 110, user devices 104, 153, 155 may also wirelessly connect to other user devices 104, 153, 155. For example, user device 104 may form a wireless ad hoc (peer-to-peer) network with user device 153 using WiFi, Bluetooth, or other wireless communication protocols.

User devices 104 and 153 each include a studying module 135. The studying module 135 assists a user in learning the subject matter disclosed in an electronic publication such as an electronic textbook. The studying module 135 tracks and analyzes a user's reading behavior, and selects problems for the user to solve based on the reading behavior. The studying module 135 then analyzes the user's solutions to the selected problems, and based on the analyzed solutions generates a study plan for the user to help the user better understand material in the electronic publication. The studying module 135 may also exchange information with other studying modules 135 for collaborative learning. Studying modules 135 may also report information to a teaching module 180 of an instructor's user device 155. Additionally, studying module 135 may provide testing functionality and/or prerequisite management functionality. Studying module 135 is described in greater detail with reference to FIG. 2A below.

The instructor's user device 155 includes a teaching module 180. The teaching module 180 receives data from studying modules 135, and generates reports on student understanding of assigned material, user's solutions to problems, etc. The teaching module 180 may also send assignments to studying modules 135 (e.g., reading assignments) and perform other instruction or administrative related tasks. In one embodiment, the studying modules 135 report information on reading behavior and/or user solutions to item providing server 125. Item providing server 125 may then aggregate these reports and send them to teaching module 180. Teaching module 180 is discussed in greater detail below with reference to FIG. 2B.

Figure 2A:
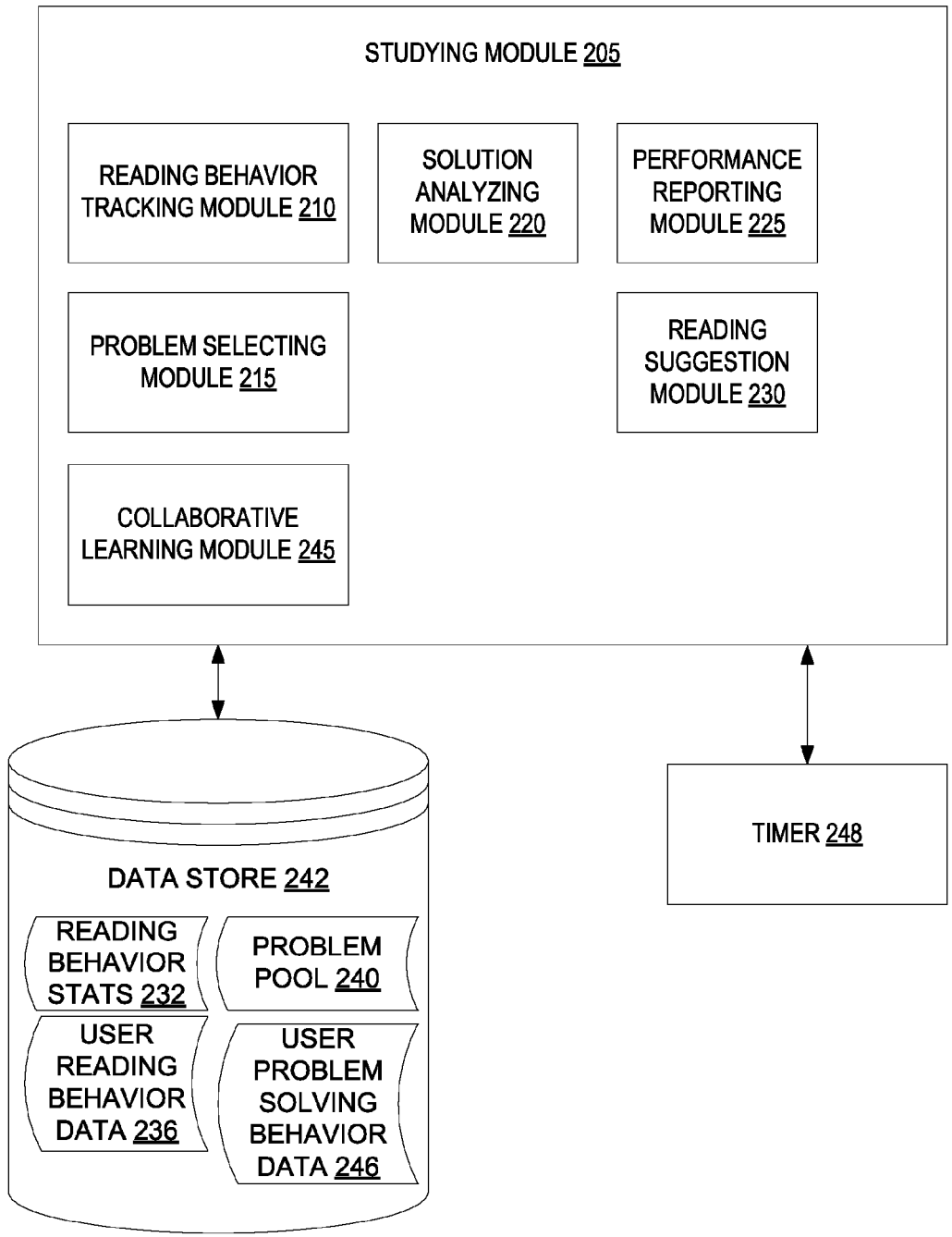
FIG. 2A is a block diagram of one embodiment of a studying module.

FIG. 2A is a block diagram of one embodiment of a studying module 205 that is included in a user device, which may correspond to studying module 135 of FIG. 1. In one embodiment, studying module 205 includes a reading behavior analyzing module 210, a problem selecting module 215, a solution analyzing module 220 and a reading suggestion module 230. Studying module 205 may also include a performance reporting module 225 and a collaborative learning module 245. In one embodiment, studying module 205 is connected to a data store 242, which may be a file system, database or other data management layer resident on a data storage device such as a disk drive, RAM, ROM, database, etc.

Electronic publications have variable sized fonts, and the user device can re-page material based on the amount of text that can fit on a single page using a selected font size. Additionally, the user device may divide the text of electronic publications into pages based on contents of the text. For example, if a specific portion of the text deals with a particular educational topic, then that portion of the text may be included in a separate page than other adjacent text that deals with another topic. This may be the case even if there is space for text discussing both topics to be displayed on a single page at a current chosen font size.

Reading behavior analyzing module 210 tracks a user's reading behavior while the user reads an active electronic publication (e.g., an electronic textbook). Reading behavior analyzing module 210 may then record the user's reading behavior data 236 in data store 242. The user device includes a timer 248. The timer 248 may be a component of the studying module 205, or may be external to the studying module 205, as shown. The reading behavior analyzing module 210 can track the amount of time that a user has a specific page open using the timer 248. Additionally, the reading behavior analyzing module 210 includes information on specific portions of text that are displayed on the user device at any given time. For example, the reading behavior analyzing module 210 may start a timer when a portion of an electronic publication is initially displayed, and stop the timer when the user issues a change page commend. Thus, the reading behavior analyzing module 210 can identify how much time a user spends reading each portion of text and how many portions of text the user finishes reading. The reading behavior analyzing module 210 can use this information to identify what portions of the text the user has a higher probability of understanding and what portions of the text the user has a lower probability of understanding. For example, if a user spends too little time reading a portion of text, it may be concluded that the user did not spend enough time to fully absorb the contents of that portion of the text. Additionally, if the user spent too much time on a portion of text, it may be concluded that the user is struggling with the portion of text, or possibly that the user has dozed off.

In one embodiment, the reading behavior analyzing module 210 accesses reading behavior statistics (stats) 232 from data store 242. The reading behavior statistics 232 may include information on how long it took other users to read through a particular section of the text. This may include an average, median, standard deviations, etc. on the reading pace for the section. The reading behavior analyzing module 210 may compare the amount of time that the current user spent reading the particular section of text to the average time to read through the section. If the user's reading speed deviated from the average by more than a threshold amount (e.g., faster or slower by more than the threshold amount), then the reading behavior analyzing module 210 may determine that the user is likely to have an incomplete understanding of the material. The user's reading behavior may also be compared to other reading behavior criteria such as percentage of completed reading, etc.

In one embodiment, the reading behavior statistics 232 include information identifying the user's average reading speed. The reading behavior statistics 232 may also include information on a level of difficulty of contents for portions of text being read. The reading behavior analyzing module 210 may estimate a user's level of understanding of a portion of text based on the user's reading speed for the portion of text, the user's average reading speed, the text difficulty, and/or other reading behavior statistics 232. In one embodiment, the reading behavior analyzing module 210 sets upper and lower reading speed thresholds for a portion of text based on the user's average reading speed and/or the text difficulty. If the user's reading speed is faster than the upper threshold or slower than the lower threshold, the reading behavior analyzing module 210 determines that a user may not have full understanding of the contents of those portions of text.

In one embodiment, the reading behavior analyzing module 210 determines the difficulty of a portion of text based on the average reading speeds of multiple users for that portion of text. The difficulty of the portion of text may also be determined based on a percentage of users who correctly solve problems based on the portion of text.

In one embodiment, the user device includes one or more sensors such as touch sensors, proximity sensors and motion sensors that the user device can use to identify whether the user device is being held by a user. If the reading behavior analyzing module 210 determines that a user is taking an uncharacteristically long time reading through a portion of text, it may check data from the sensors to determine whether the user device is being held by a user. If the user device is not being held by a user and no page turn signal has been sent to the user device for a threshold period of time, the reading behavior analyzing module 210 may determine that the user is not currently reading the current portion of text, and stop the timer and/or deduct time from the timer.

In one embodiment, the user device includes an optical sensor that tracks user eye movement. Reading behavior analyzing module 210 may then correlate the user eye movement to currently displayed portions of text. This information may be used to more accurately identify how a user is progressing through particular portions of reading, whether a user is nodding off (e.g., if eyes are detected to be closed or droopy), or whether a user is not looking at the user device (in which case the timer can be paused). Thus, the optical sensor can provide additional information on a user's reading behavior.

In one embodiment, each portion of text is associated with one or more problems from a problem pool 240, which is included in data store 242. The problem pool 240 includes pre-generated problems based on material included in the text. These pre-generated problems may have been generated by an author or publisher of the text, or may have been generated by an instructor that assigned the text for studying. A problem may be an exercise that a user is expected to solve with a full written solution. Alternatively, the problem may be an exercise that the user is expected to answer with a solution's end result (e.g., just the final answer). The problem may also be a multiple choice question or a true/false question.

Problem selecting module 215 receives information on the user's reading behavior from reading behavior analyzing module 210, or retrieves user reading behavior data 236 from data store 242. Problem selecting module 215 receives user reading behavior information that includes data from multiple different portions of text. The multiple different portions of text may include multiple portions of text for a single publication and/or portions of text from multiple different publications. The reported reading behavior identifies which portions of text a user is likely to have a good understanding of, and which portions of the text the user is likely to have a poor understanding of. The problem selecting module 215 then selects one or more problems from the problem pool 240 that are associated with the material taught in the portions of the text that the user appears to have a poor understanding of. Problem selecting module 215 may also select additional problems that an instructor has labeled as mandatory, regardless of the user's reading behavior. For example, if there is a specific topic that the instructor views as especially important, then the instructor may set a flag for that topic or for specific problems related to that topic for users to solve. Accordingly, problem selecting module 215 dynamically selects problems based on user reading behavior. As used herein, dynamic problem selection is defined as a selection of one or more problems by the problem selecting module 215 in response to determined or detected user reading behavior.

In one embodiment, problem selecting module 215 includes information that identifies subjects that the user has previously learned (e.g., educational courses that the user has taken and passed). Problem selecting module 215 may use the information on previously learned subject matter to select problems. For example, if the user is reading a portion of a physical textbook, and the user has passed a differential equations course, then the problem selecting module 215 may select a problem that covers a particular physics concept, and that uses differential equations. However, if the user has not taken a differential equations course, then problem selecting module 215 may select a different problem that covers the physics concept, but that does not use differential equations.

Solution analyzing module 220 tracks a user's problem solving behavior. This includes tracking how much time it takes for the user to solve an assigned problem or problems. Once the user has completed a solution for the problem, solution analyzing module 220 further analyzes a correctness of the solution. Problem pool 240 may include one or more correct solutions to some or all problems included in the problem pool 240. Solution analyzing module 220 compares the user's solution to the one or more stored solutions. Based on this comparison, the solution analyzing module 220 determines whether the user correctly answered the problem.

In one embodiment, in addition to determining whether the user correctly answered the problem, the solution analyzing module 220 determines whether the user answered the question quicker or slower than average. The problem pool 240 may include problem solving statistics, such as average solution times for problems, as well as standard deviations from average solution times. Solution analyzing module 220 may compare the amount of time that it took for the user to solve the problem to the average answer time for that problem. If the user answered the question slower than usual, then it may be determined that the user has an incomplete grasp on the subject matter of the problem, even if the user's solution was correct. Additionally, if the user answered the question quicker than usual, it may be determined that the user has a good grasp on the subject matter, provided that the user's solution was correct. In one embodiment, if the user's solution time was significantly faster than the average, it may be determined that the user guessed at the solution, or that the user cheated.

In one embodiment, solution analyzing module 220 tracks user problem solving behavior (e.g., such as the amount of time that it took the user to solve the problem, a correctness of the user's problem solution, etc.). In a further embodiment, solution analyzing module 220 stores user problem solving behavior data 246 in data store 242. Solution analyzing module 220 may then generate a report for the user that identifies topics that the user has trouble with and/or types of problems that the user has trouble with. For example, solution analyzing module 220 may notify a user that the user is taking too long to answer particular types of problems (e.g., reading comprehension multiple choice problems). This may help the user train for tests.

Reading suggestion module 230 suggests additional reading for the user based on the user's reading behavior and/or based on the user's problem solutions. Reading suggestion module 230 may compare the user's reading behavior to reading behavior criteria (e.g., upper and lower speed thresholds) and may compare the user's problem solving behavior to problem solving behavior criteria (e.g., correct solution, upper and lower solution time thresholds, etc.). Reading suggestion module 230 may then take one or more actions based on whether the reading behavior satisfied any reading behavior criteria and/or whether the problem solving behavior satisfied any problem solving behavior criteria. In one embodiment, reading suggestion module 230 suggests portions of the text that are associated with the material tested by an incorrectly answered problems for re-reading. Additionally, if the user answered a problem correctly, but took a long time in reaching the solution, portions of text associated with that problem may be suggested to the user for re-reading. Reading suggestion module 230 may also suggest portions of additional electronic textbooks or other additional electronic books or other publications for the user to read based on the user's reading behavior and/or the user's problem solutions.

In one embodiment, reading suggestion module 230 includes a data structure (e.g., a list, table, etc.) that associates subjects with portions of publications. Each entry in the data structure may associate a particular subject/topic with multiple portions of text from one or more publications. Reading suggestion module 230 may use the data structure to suggest particular portions of text from one or more publications to a user.

Problem selecting module 215 may select additional problems for the user to solve based on the user's reading behavior and/or the user's problem solutions. For example, if the user answered a problem incorrectly, then the problem selecting module may select an additional problem that tests the same subject matter. Moreover, if it was determined by solution analyzing module 220 that the user likely guessed or cheated in answering a problem, the problem selecting module 215 may select an additional problem for the user to solve that tests the same subject matter as the original problem.

Performance reporting module 225 reports the user's reading behavior (e.g., user reading behavior data 236), the user's problem solutions, the user's problem solving behavior (e.g., user problem solving behavior data 246), and/or whether the user completed any additional reading suggested by reading suggestion module 230 to an item providing system. In one embodiment, the user problem solving behavior data 246 includes both the solution itself and additional data on how the user solved the problem (e.g., how much time it took for the user to solve the problem). The item providing system may then aggregate this information with reading behavior and problem solution information from other users, and send the aggregated report to an instructor's user device. Alternatively, the performance reporting module 225 may report the user's reading behavior information and problem solutions directly to the instructor's user device (e.g., the next time that the user attends class, which may cause the user's user device to be within range of wirelessly connecting to the instructor's user device).

In one embodiment, the studying module 205 includes a collaborative learning module 245. For some subjects (e.g., math and physics) it is beneficial for users to work on problems together to better understand complex subject matter. Additionally, some problems are very complicated to solve, and may be beyond the skill of a single user. For such problems, collaborative learning module 245 may be enabled. Collaborative learning module 245 shares one user's problem solution information with other users while the user is solving the problem. The collaborative learning module 245 also receives problem solution information from other user devices. The collaborative learning module 245 may then show other user's problem solution information to the user and/or compare the other user's problem solution information to the user's problem solution information. Thus, users may solve problems collaboratively. In one embodiment, an instructor can enable or disable the collaborative learning module 245. It may be enabled on a time basis, on a per problem basis, or on some other criterion. In one embodiment, collaborative learning module 245 only exchanges problem solution information via an ad hoc (peer-to-peer) network connection. Thus, user devices may need to be near each other to enable the collaborative learning functions. This may increase a likelihood that each user contributes to the solution. In one embodiment, the collaborative learning module 245 tracks what portions of a group's solution are provided by each user in the group.

In one embodiment, studying module 205 includes a testing mode. When the testing mode is active, the user may be restricted from accessing any reading material other than specific portions of text specified by an instructor. Problem pool 240 may include a subset of problems that are designated for tests. During a test, problem selecting module 215 chooses one or more problems for the user based on the user's prior reading behavior, prior problem solving behavior and/or prior problem solutions. Additionally, during the test, problem selecting module 215 may select subsequent test problems based on a user's problem solution and/or problem solving behavior in regards to one or more previous test problems that the user solved in the current test session. For example, more difficult problems may be selected if a user is correctly answering questions too quickly, or easier problems may be selected if the user is answering questions too slowly or is incorrectly answering questions. Thus, test problems may be automatically selected to pace a user to cause the user to finish the test within a predetermined time period.

Problem selecting module 215 may also select test problems based on problem solutions and/or problem solving behavior from one or more previous test sessions to select a problem. For example, if the user correctly solved problems testing a particular subject in a previous test, then that subject may not be tested for that user in a current test. However, if the user answered some problems incorrectly in a previous test, new problems testing the same subject matter covered in the incorrectly answered problems may be selected.

Dynamic selection of test problems enables users to be individually tested on test topics that those users previously struggled with to determine whether the users have learned the subjects. Moreover, dynamic testing increases a difficulty of users cheating and/or copying off of one another.

In one embodiment, studying module 205 assesses a user's knowledge of a subject or multiple subjects before the user reads any portions of text. For example, the studying module 205 may assess the user's knowledge of one or more subjects that will be covered in a class when the class first begins (e.g., at the start of a semester.) The studying module 205 may also test prerequisites that the user should know to fully comprehend reading material that will be covered. In one embodiment, problem selecting module 215 selects the problems to test the prerequisites and/or material that will be covered. Solution analyzing module 220 may then analyze user solutions to the problems, and reading suggestion module 230 may set up a study plan for the user based on the problem solutions. The study plan may include reading material that will teach the user the prerequisites that the user needs to know to fully comprehend subjects taught by other assigned reading.

Figure 2B:
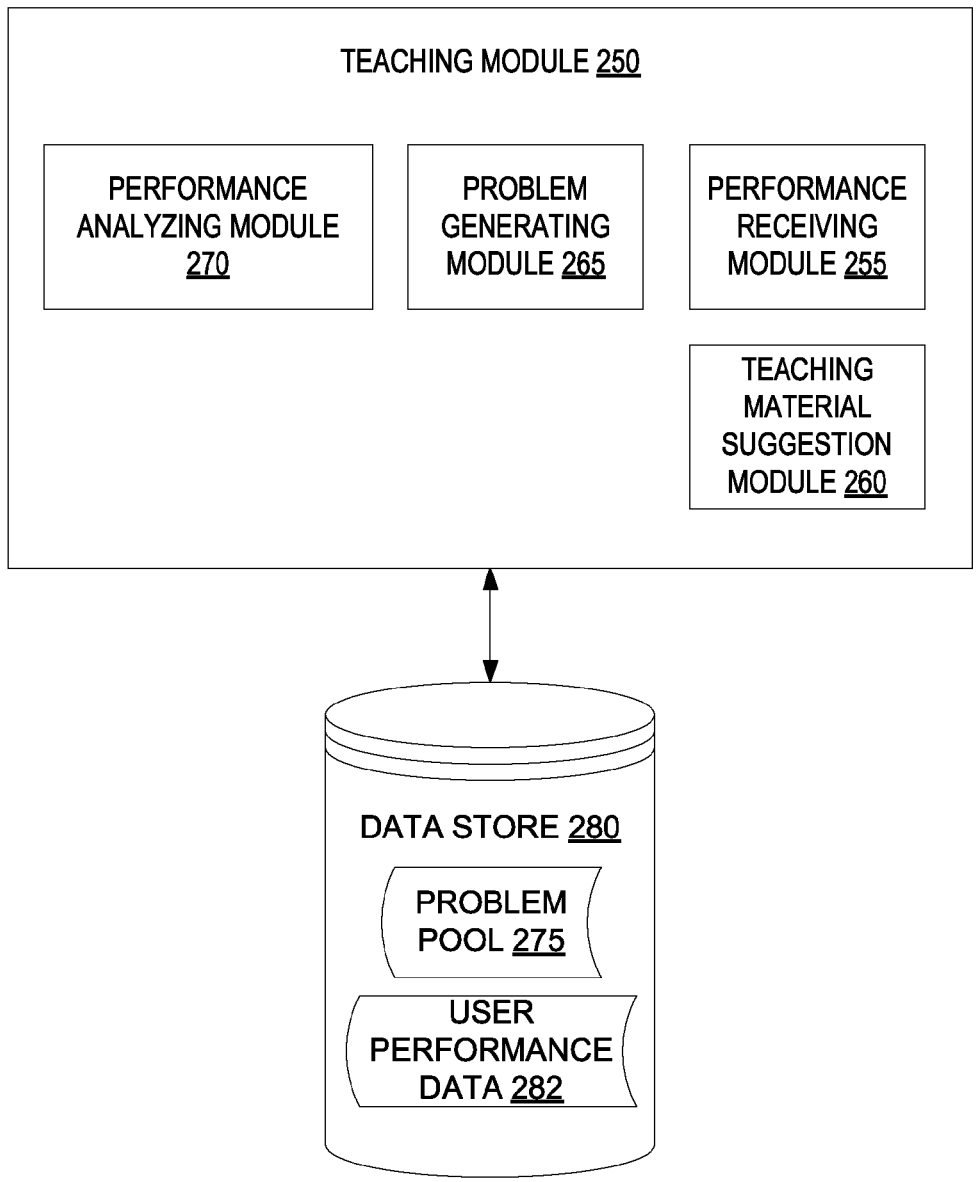
FIG. 2B is a block diagram of one embodiment of a teaching module.

FIG. 2B is a block diagram of one embodiment of a teaching module 250, which may correspond to teaching module 180 of FIG. 1. Teaching module 250 may be included in an instructor's user device. Alternatively, teaching module 250 may be included in an item providing server. In one embodiment, teaching module 250 includes a performance receiving module 255, a performance analyzing module 270, a problem generating module 265 and a teaching material suggestion module 260. In one embodiment, teaching module 250 is connected with a data store 280, which may be a file system, database or other data management layer resident on a data storage device such as a disk drive, RAM, ROM, database, etc.

Performance receiving module 255 receives user performance data from user devices or from the item providing system. The received performance data includes user reading behavior, user problem solutions and/or user problem solving behavior. The received performance data may also include information on whether the user performed any suggested additional reading and on user problem solving behavior, such as an amount of time that it took for the user to complete the problem solutions. In one embodiment, performance receiving module 255 stores the received user performance data 282 in data store 280.

Performance analyzing module 270 analyzes the performance data 282. Performance analyzing module 270 may determine the average reading behaviors of users, which problems were selected for different users to solve, statistics on correctly answered problems and incorrectly answered problems, problem solving times, etc. Performance analyzing module 270 may also identify users who are struggling with material covered by assigned text portions, as well as those who appear to have a good grasp of the material.

Teaching material suggestion module 260 suggests material from portions of text that at least a threshold number of users are struggling with for the instructor to cover. Teaching material suggestion module 260 may also suggest slowing down a pace of material covered (e.g., when reading behavior and/or problem solutions indicate user's do not fully understand the material), or speeding up the pace of material covered (e.g., if reading behavior and/or problem solutions indicate user's fully understand the material). Additionally, reading material suggestion module 260 may select a group of users who share a lack of understanding of the same portions of the text for an additional tutorial. For example, if most of the users appear to understand the material, but a minority appear to have similar problems with the material, the teaching material suggestion module 260 may suggest a tutorial for those users on that material.

Teaching module 250 may include a problem generating module 265. An instructor may generate new problems via the problem generating module 265, and store those new problems along with existing problems in problem pool 275, which may be in data store 280. When a new problem is generated, the instructor may associate the problem with one or more portions of the text. Alternatively, problem generating module 265 may analyze the newly generated problem and compare it to multiple portions of text from one or more electronic publications. The problem generating module 265 may then associate the newly generated problem with portions of text that cover a subject matter tested by the problem. In one embodiment, the problem generating module 265 prompts the user that generated the new problem for confirmation of the automatically determined text portion associations. For example, the problem generating module 265 may parse the new problem and search for text and/or equations in publications that match text and/or equations from the problem (or from a supplied solution to the problem). Where a match is found between contents of the new problem and contents of a portion of a publication, an association may be generated. Therefore, the problem may be selected by problem selecting module 215 when the associated one or more portions are indicated by reading behavior analyzing module 210.

Problem generating module 365 may send the new problems to item providing system, which may forward the new problems on to user devices. Alternatively, problem generating module 265 may send the problems directly to user devices of students (e.g., using a peer-to-peer connection).

In one embodiment, the functionality of performance analyzing module and/or teaching material suggestion module 260 may be included in the item providing system instead of, or in addition to, being included in teaching module 250. For example, the item providing system may analyze performance information and send a report based on such an analysis to teaching module 250.

Figure 3:
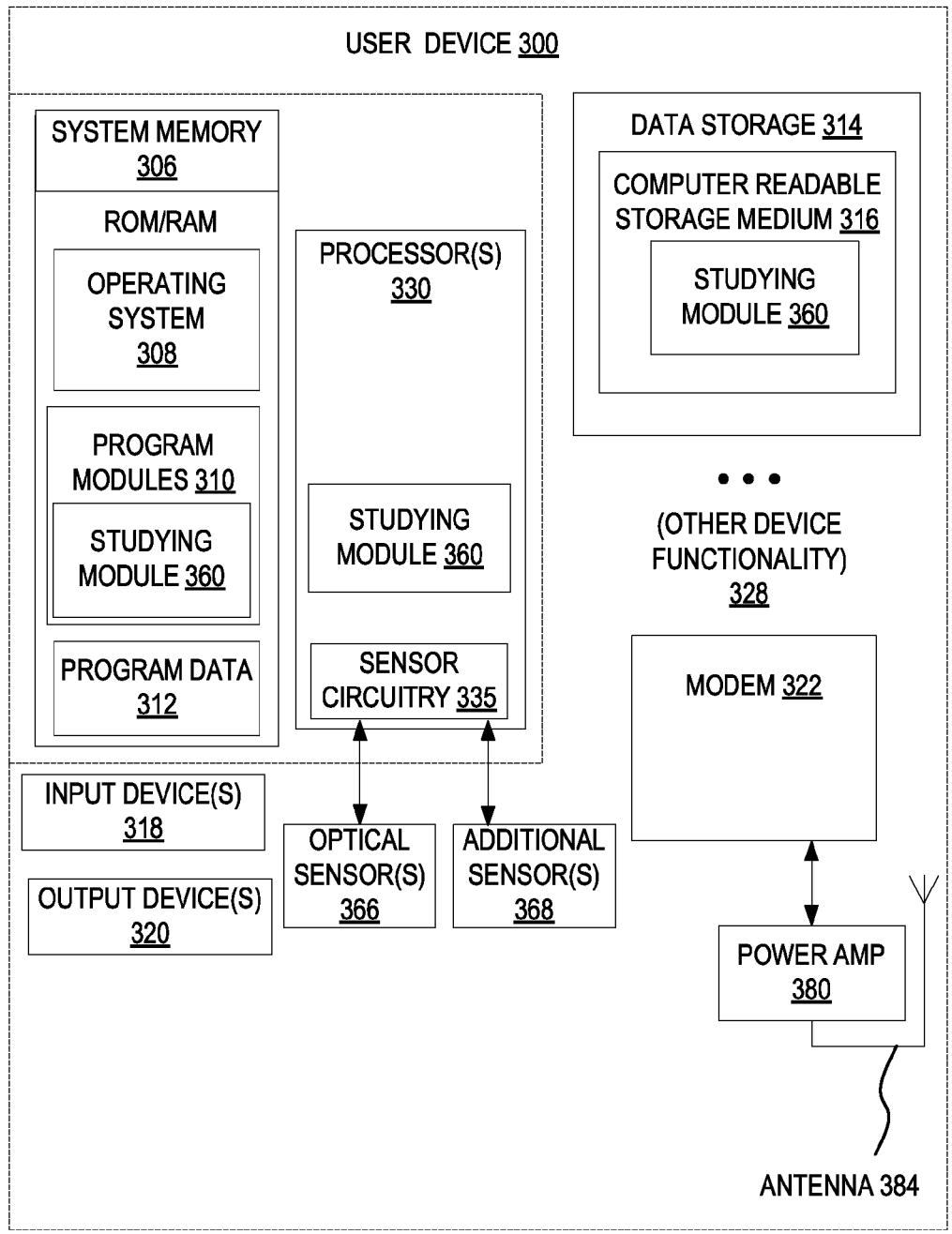
FIG. 3 is a block diagram illustrating an exemplary user device.

FIG. 3 is a block diagram illustrating an exemplary user device 300. The user device 300 may correspond to the user device 104 of FIG. 1 and may be any type of user device such as an electronic book reader, a PDA, a mobile phone, a laptop computer, a portable media player, a tablet computer, an electronic pad, a desktop computer, a camera, a video camera, a netbook, and the like.

The user device 300 includes one or more processors 330, such as one or more CPUs, microcontrollers, field programmable gate arrays, or other types of processors. The user device 300 also includes system memory 306, which may correspond to any combination of volatile and/or non-volatile storage mechanisms. The system memory 306 stores information which provides an operating system component 308, various program modules 310 such as studying module 360, a teaching module (not shown), and/or other components. The user device 300 performs functions by using the processor(s) 330 to execute instructions provided by the system memory 306.

The user device 300 also includes a data storage device 314 that may be composed of one or more types of removable storage and/or one or more types of non-removable storage. The data storage device 314 includes a computer-readable storage medium 316 on which is stored one or more sets of instructions embodying any one or more of the methodologies or functions described herein. As shown, instructions for the studying module 360 (or teaching module) may reside, completely or at least partially, within the computer readable storage medium 316, system memory 306 and/or within the processor(s) 330 during execution thereof by the user device 300, the system memory 306 and the processor(s) 330 also constituting computer-readable media. In one embodiment, data storage 314 includes data store 242 of FIG. 2A and/or data store 280 of FIG. 2B. The user device 300 may also include one or more input devices 318 (keyboard, mouse device, specialized selection keys, etc.) and one or more output devices 320 (displays, printers, audio output mechanisms, etc.).

The user device 300 further includes a wireless modem 322 to allow the user device 300 to communicate via a wireless network (e.g., such as provided by the wireless communication system) with other computing devices, such as remote computers, the item providing system, online book stores, electronic catalogs for libraries, and so forth. The wireless modem 322 may allow the user device 300 to handle both voice and non-voice communications (such as communications for text messages, multimedia messages, media downloads, web browsing, etc.) with the wireless communication system 110. The wireless modem 322 may provide network connectivity using any type of mobile network technology including, for example, cellular digital packet data (CDPD), general packet radio service (GPRS), enhanced data rates for GSM evolution (EDGE), universal mobile telecommunications system (UMTS), 1 times radio transmission technology (1xRTT), evaluation data optimized (EVDO), high-speed downlink packet access (HSDPA), WiFi, etc. The wireless modem 322 may generate signals and send these signals to power amplifier (amp) 380 for amplification, after which they are wirelessly transmitted via antenna 384. In addition to sending data, antenna 384 also receives data, which is sent to wireless modem 322 and transferred to processor(s) 330.

In one embodiment, user device 300 includes an optical sensor 366. The optical sensor 366 may be a low resolution camera (e.g., having 0.2 or 0.3 Megapixels) that takes images (e.g., of a user's eyes) on a periodic basis. Alternatively, the optical sensor 366 may have a higher resolution, such as 1 Megapixel up to 10 or more Megapixels. The optical sensor 366 may be positioned such that images are taken of a user's face while the user holds the user device 300 in front of his face in a standard reading position. Therefore, the optical sensor 366 may be used to track user eye movement during reading.

In one embodiment, user device 300 includes one or more additional sensors 368 such as a physical contact sensor, close proximity sensors, or motion sensors. The sensors 368 can detect the presence of human body parts, and convey information regarding the detected presence to processor(s) 330. In one embodiment, the sensors 368 may be capacitive sensors that are configured to measure capacitance generated by the presence of the human body part using any one of various techniques known in the art, for example, relaxation oscillation, a current verses voltage phase shift comparison, resistor-capacitor charge timing, capacitive bridge division, charge transfer, sigma-delta modulation, or charge-accumulation. In an alternative embodiment, the sensors 368 may also be optical (e.g., infrared) sensors that use an emitter and receiver pair to detect the presence of opaque objects. Alternatively, the sensors 368 may be inductive sensors, which include an inductive loop. When the presence of a human body part (or metal object) is brought close to the inductive sensor, an induction of the inductive loop changes, causing the human body part to be detected. Alternatively, the sensors 368 may be ultrasonic sensors that emit an ultrasonic signal and measure a time duration between when a signal is transmitted and the reflection of that signal received (a.k.a., flight response). The sensors 368 may also include other types of sensors, such as those that operate using the detection principles of resistive (e.g., analog resistive, digital resistive or residual resistive), surface acoustic wave, electromagnetic, near field imaging, or other technologies. In one embodiment, multiple different types of sensors are used. Though the detected object is described herein as a human body part, other types of objects may also be detected depending on the sensing technologies used.

In one embodiment, the additional sensors 368 include a motion sensor, such as an accelerometer or gyroscopes. The user device 300 may use motion data from motion sensors to determine whether a user is holding the user device 300. For example, if the user device 300 experiences constant minor accelerations, it may be determined that the user device 300 is being held in a user's hand. Additionally, if the user device 300 is at a particular angle (detectable based on acceleration readings from an accelerometer), it may be determined that the user device 300 is being rested on a user's leg during reading.

The processor(s) 330 may include sensor circuitry 335 (e.g., sensor device drivers) that enables the processor(s) 330 to interpret signals received from the optical sensor(s) 366 and/or additional sensors 368. In one embodiment, the optical sensors 366 and/or additional sensors 368 output raw sensor data. In another embodiment, the optical sensors 366 and/or additional sensors 368 output fully processed signals to the processor(s) 330. For example, the additional sensors 368 may output a user contact/no user contact signal using a single line interface or a multi-line interface. In another embodiment, the additional sensors 368 output, for example, positional data and/or object presence data (e.g., of a human body part) to the processors 330 without first processing the data. In either instance, the processors 330 may use the sensor circuitry 335 to process and/or interpret the received data. If data is received from multiple sensors, processing the data may include averaging the data, identifying a maximum from the data, or otherwise combining the data from the multiple sensors.

Figure 4:
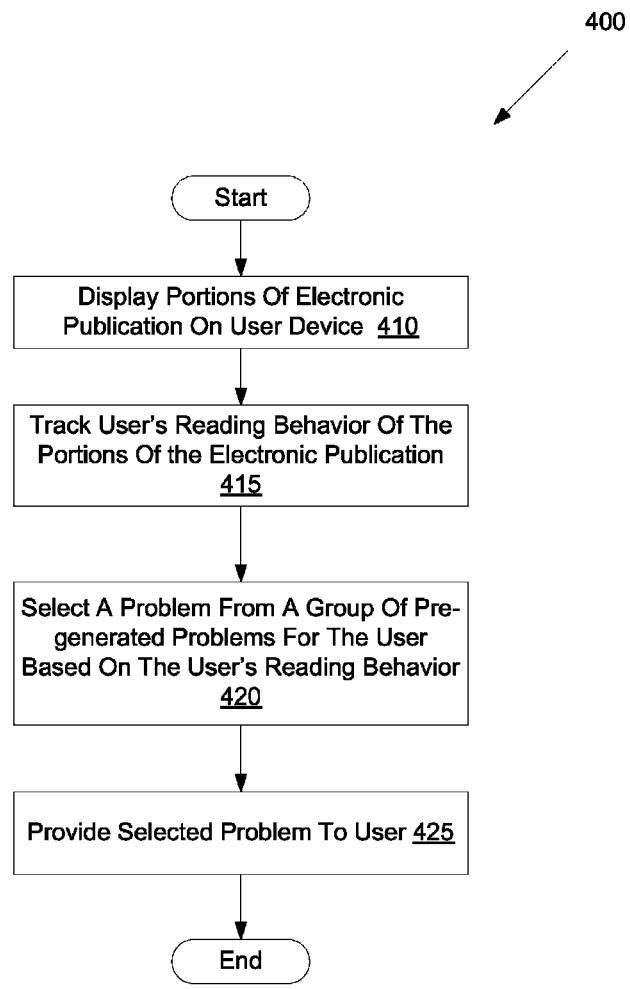
FIG. 4 is a flow diagram of one embodiment for a method of dynamically selecting problems for a user based on the user's reading behavior.

FIG. 4 is a flow diagram of one embodiment for a method 400 of dynamically selecting problems for a user based on the user's reading behavior. The method is performed by processing logic that may comprise hardware (circuitry, dedicated logic, etc.), software (such as is run on a general purpose computer system or a dedicated machine), or a combination of both. In one embodiment, method 400 is performed by a user device or by a component of a user device. For example, method 400 may be performed by a studying module 135 of user device 135 of FIG. 1. In one embodiment, processing logic includes one or more hardware or software modules, such as the modules of studying module 135.

Referring to FIG. 4, at block 410 of method 400 processing logic displays portions of an electronic publication on a user device (e.g., on a screen of a user device). The displayed portions of the electronic publication may be reading material that has been assigned by an instructor. For example, the assigned reading may be a chapter of an electronic textbook, a subchapter of an electronic textbook, or a portion of a subchapter of an electronic textbook. The assigned reading may also be a chapter or subsection of some other electronic book (other than a textbook) or other electronic publication. A single portion of text may be a page of text, multiple pages of text, or a part of a page of text. Since font size is variable in electronic texts, and the number of pages varies with the font size, the size of a portion of text may also be variable.

At block 415, processing logic tracks a user's reading behavior of the portions of text for the electronic publication. This may include timing how much time the user spends reading portions of the publication, what portions of the publication the user reads, a user's eye movement while he is reading portions of the publication, and so on.

The processing logic may determine, based on the user's reading behavior, what portions of the text the user has a high likelihood of understanding as well as what portions of the text the user has a low likelihood of understanding. Processing logic may use a number of heuristics to make such a determination. For example, the processing logic may compare the user's reading speed for particular sections to the user's reading speed of other sections. The user's reading speed over a number of sections may be used to establish a user reading speed baseline. The current reading behavior may be compared to the reading speed baseline to make an educated guess on how difficult the user finds the current text. The processing logic may also compare the user's reading speed for a particular section to other user's reading speeds of that section or to a difficulty rating assigned to that section. Based on these comparisons, the processing logic may make a determination on user understanding of material covered by the portions of text.

At block 420, the processing logic dynamically selects a problem from a group (pool) of pre-generated problems for the user based on the user's reading behavior. In one embodiment, the processing logic selects the problem based on the user's apparent understanding of different portions of the text that the user read. For example, problems that test the subject matter that the user appears to understand the least well may be selected. At block 425, the selected problems are provided to the user.

Figure 5:
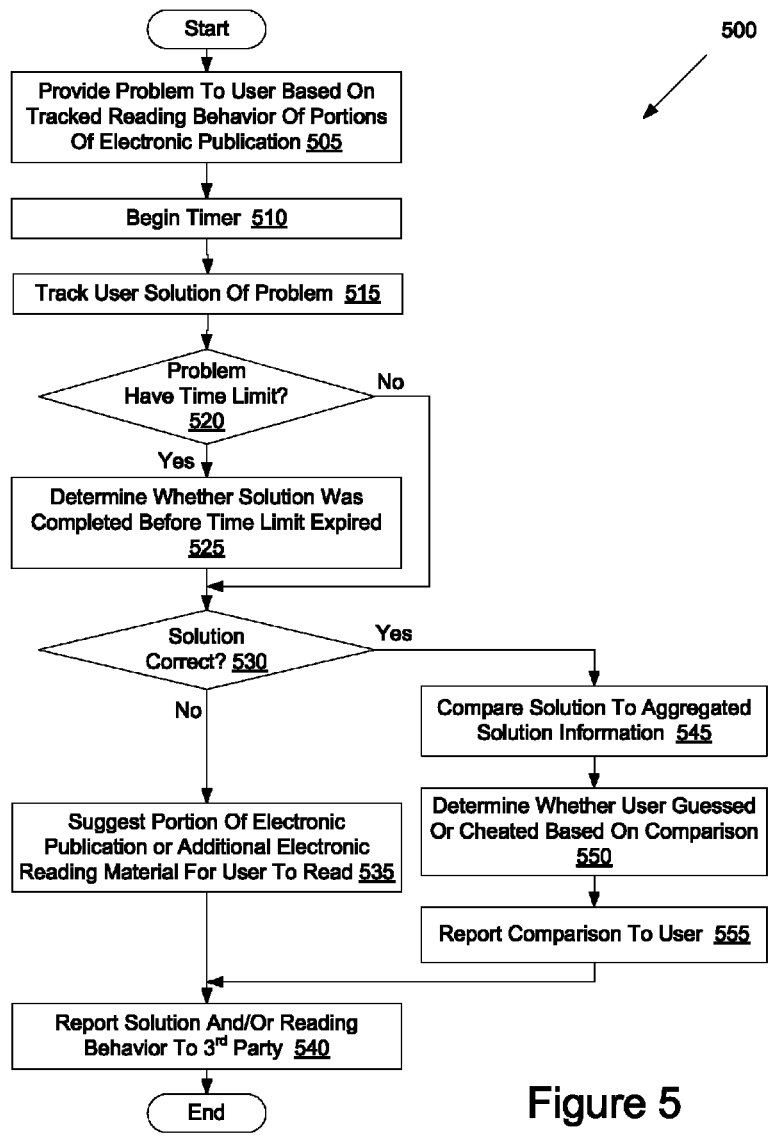
FIG. 5 is a flow diagram of one embodiment for a method of analyzing a user's solution to a problem and providing feedback.

FIG. 5 is a flow diagram of one embodiment for a method 500 of analyzing a user's solution to a problem and providing feedback. The method is performed by processing logic that may comprise hardware (circuitry, dedicated logic, etc.), software (such as is run on a general purpose computer system or a dedicated machine), or a combination of both. In one embodiment, method 500 is performed by a user device or by a component of a user device. For example, method 500 may be performed by a studying module 135 of user device 135 of FIG. 1. In another embodiment, some operations of method 500 are performed by a user device, while other operations are performed by an item providing system. Alternatively, some operations may be performed by one user device, while other operations are performed by another user device. In one embodiment, processing logic includes one or more hardware or software modules, such as the modules of studying module 135.

Referring to FIG. 5, at block 505 of method 500 processing logic provides a problem to a user based on tracked reading behavior of portions of an electronic publication (e.g., an electronic textbook, other electronic book or other reading material). At block 510, processing logic begins a timer. At block 515, processing logic tracks a user solution of the problem. This may include tracking user reading behavior while the user reads the problem, tracking user problem solving behavior as the user attempts to solve the problem (e.g., track user equations, notes, etc.), and identifying a final solution.

At block 520, processing logic determines whether the problem has an associated time limit. If the problem does not have a time limit, the method proceeds to block 530. If the problem does have a time limit, the method continues to block 525. At block 525, processing logic determines whether the solution was completed before the time limit expired. If the time limit has expired, then the solution may be marked as incorrect, even if the user ultimately finds the correct solution. Once the time limit expires, the user may no longer be able to work on the problem. Alternatively, the user may be able to continue to work on the problem, but may not be given work credit for the problem by an instructor. A timeout flag may be set on the problem solution if the timer timed out. In one embodiment, the problem solution distinguishes between work that was completed prior to the timer timing out, and work that was completed after the timer timed out.

At block 530, processing logic determines whether the user's solution to the problem is correct. If the solution is correct, the method continues to block 545. If the solution is not correct, the method continues to block 535.

At block 535, processing logic suggests a portion of the electronic publication or a portion of additional reading material for the user to read. The additional reading material may be an article, another textbook, literature, a history book, etc. The processing logic may download the suggested material from an item providing system if it is not already on a user device. The suggested portion of the electronic publication or additional reading material may be suggested based on one or more problems that the user failed to answer correctly. For example, if the user is taking a history class, and the failed questions related to a particular time period, then the suggested reading may relate to that time period. The suggested reading material may also be based on a user's reading behavior.

At block 545, processing logic compares the solution to aggregated solution information. The aggregated solution information may include a collection of correct answers, average user answers, an average time that it took for other users to complete a solution to the problem, etc. At block 550, processing logic determines whether the user guessed or cheated based on the comparison. In one embodiment, if the user generated a correct answer in a much faster pace than most users who answered the question, then it may be determined that the user guessed or cheated. For example, if it normally takes a user 1 minute just to read through the problem, but the user answered the problem correctly in 30 seconds, processing logic may determine that the user has cheated or guessed at the solution. In one embodiment, if it is determined that the user guessed or cheated, then the processing logic presents the user with an additional problem to solve.

At block 555, processing logic reports the comparison to the user. Processing logic may show the user how long it took him to complete the solution verses the average completion time. The processing logic may also show the user how many standard deviations his answer pace is from a standard, and the percentile that the user's answer speed is in. Note that blocks 545 and 555 may also be performed after block 535. Therefore, even if the user answered the problem incorrectly, the processing logic may still compare the user's answer and his time to generate the answer to stored information and report the findings to the user.

At block 540, the processing logic reports the solution and/or the user's reading behavior to a third party. Processing logic may report this information to an item providing system, to an instructor's user device, or to both. The method then ends.

In the above description, numerous details are set forth. It will be apparent, however, to one of ordinary skill in the art having the benefit of this disclosure, that embodiments of the invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "searching", "providing", "receiving", "determining", "identifying" or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage devices.

Embodiments of the invention also relate to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a user device, comprising:
    displaying portions of an electronic publication on the user device;
    tracking a user's reading behavior of the portions of the electronic publication by the user device;
    selecting a problem from a group of pre-generated problems for the user based on the user's reading behavior; and
    providing the selected problem to the user.

2. The method of claim 1, further comprising:
    tracking an amount of time that it takes for the user to generate a solution to the problem;
    determining a correctness of the solution; and
    suggesting one or more portions of the electronic publication for the user to re-read based on the correctness of the solution and the amount of time that it took the user to generate the solution.

3. The method of claim 2, further comprising:
    reporting the solution and the amount of time that it took the user to generate the solution to an instructor's user device; and
    suggesting material for the instructor to review with the user based on at least one of the user's reading behavior, the solution, and the amount of time that it took the user to generate the solution.

4. The method of claim 2, further comprising:
    suggesting portions of an additional publication for the user to read based on the solution and the amount of time that it took the user to generate the solution.

5. The method of claim 2, further comprising:
    comparing the solution and the amount of time that it took the user to generate the solution to a combination of other solutions for the same problem as well as times that it took other users to generate the other solutions; and
    determining whether the user is cheating based on the comparison.

6. The method of claim 2, further comprising
    comparing the solution and the amount of time that it took the user to generate the solution to a combination of other solutions for the same problem as well as times that it took other users to generate the other solutions; and
    reporting the comparison to the user.

7. The method of claim 1, wherein tracking the user's reading behavior includes the following:
    tracking how fast the user reads the portions of the publication; and
    determining which portions of the publication the user has finished reading.

8. The method of claim 7, wherein the user device includes an optical sensor, the method further comprising:
    tracking the user's eye movement using the optical sensor while displaying the portions of the publication, wherein tracking the user's reading behavior comprises tracking the user's eye movement.

9. The method of claim 1, further comprising:
    determining whether the user's reading behavior satisfies a reading behavior criterion; and
    selecting the problem in response to determining that the user's reading behavior satisfies the reading behavior criterion.

10. A system comprising:
    an apparatus having a memory to store instructions for a studying module and a processor, connected to the memory, to execute the instructions, wherein the instructions cause the processor to:
        display portions of an electronic publication on a display;
        track a user's reading behavior of the portions of the electronic publication;
        select a problem from a group of pre-generated problems for the user based
    on the user's reading behavior; and
        provide the selected problem to the user.

11. The system of claim 10, further comprising the instructions to cause the processor to:
    track an amount of time that it takes for the user to generate a solution to the problem;
    determine a correctness of the solution; and
    suggest one or more portions of the electronic publication or an additional electronic publication for the user to read based on the correctness of the solution and the amount of time that it took the user to generate the solution.

12. The system of claim 11, wherein the time that it takes for the user to generate the solution to the problem and the correctness of the solution are included in problem solving behavior of the user, the system further comprising:
    an additional apparatus of an instructor to receive the user's reading behavior and the user's problem solving behavior as well as additional user's reading behaviors and additional user's problem solving behaviors, and to suggest material for the instructor to review with the user and one or more additional users based on at least one of the user's reading behavior, the user's problem solving behavior, the additional user's read behaviors and the additional user's problem solving behaviors.

13. The system of claim 11, further comprising the instructions to cause the processor to:
    compare the solution and the amount of time that it took the user to generate the solution to a combination of other solutions for the same problem as well as times that it took other users to generate the other solutions; and
    determine whether the user is cheating based on the comparison.

14. The system of claim 11, further comprising the instructions to cause the processor to:

compare the solution and the amount of time that it took the user to generate the solution to a combination of other solutions for the same problem as well as times that it took other users to generate the other solutions; and report the comparison to the user.

15. The system of claim 10, further comprising:
an optical sensor to track the user's eye movement while the processor displays the portions of the publication, wherein tracking the user's reading behavior comprises tracking the user's eye movement.

16. The system of claim 10, further comprising the instructions to cause the processor to:
determine whether the user's reading behavior satisfies a reading behavior criterion; and
select the problem in response to determining that the user's reading behavior satisfies the reading behavior criterion.

17. The system of claim 10, wherein to track the user's reading behavior, the processor tracks how fast the user reads the portions of the publication and determines which portions of the publication the user has finished reading.

18. The system of claim 10, wherein the apparatus is a portable user device.

19. A computer readable storage medium including instructions that, when executed by a processor, cause the processor to perform a method comprising:
determining a user's reading behavior for one or more portions of an electronic publication;
selecting a problem from a group of pre-generated problems for the user based on the user's reading behavior;
determining the user's problem solving behavior for the selected problem; and
suggesting at least one of the one or more portions of the electronic publication for the user to re-read based on at least one of the user's reading behavior and the user's problem solving behavior.

20. The computer readable storage medium of claim 19, wherein determining the user's reading behavior comprises:
providing the one or more portions of the electronic publication to the user;
tracking an amount of time that it takes for the user to read each of the one or more portions of the electronic publication; and
determining whether the user read each of the one or more portions of the electronic publication.

21. The computer readable storage medium of claim 19, wherein tracking the amount of time that it takes for the user to read the one or more portions of the electronic publication comprises, for each portion:
displaying the portion of the electronic publication until the user issues a change page command;
beginning a timer when the portion of the electronic publication is initially displayed; and
stopping the timer when the user issues the change page command.

22. The computer readable storage medium of claim 19, further comprising:
determining whether the user's reading behavior satisfies a reading behavior criterion;
determining whether the user's problem solving behavior satisfies a problem solving behavior criterion; and
performing an action in response to determining that the user's reading behavior satisfies the reading behavior criterion and the user's problem solving behavior satisfies a problem solving behavior criterion.

23. The computer readable storage medium of claim 19, wherein determining the user's problem solving behavior for the selected problem comprises:
tracking an amount of time that it takes for the user to generate a solution to the problem; and
determining a correctness of the solution.

24. The computer readable storage medium of claim 23, further comprising:
comparing the solution and the amount of time that it took the user to generate the solution to a combination of other solutions for the same problem as well as times that it took other users to generate the other solutions; and
performing an action in response to an outcome of the comparing, the action including at least one of suggesting additional portions of the electronic publication for the user to read, reporting the outcome of the comparing to the user and determining whether the user cheated based on the outcome.

25. A method comprising:
providing an electronic publication to a user on a user device; and
determining, by a processor of the user device, a rate of consumption of the electronic publication for the user.

* * * * *

UNITED STATES PATENT AND TRADEMARK OFFICE
CERTIFICATE OF CORRECTION

PATENT NO. : 8,834,166 B1  
APPLICATION NO. : 12/890532  
DATED : September 16, 2014  
INVENTOR(S) : Ionkov et al.

Page 1 of 3

It is certified that error appears in the above-identified patent and that said Letters Patent is hereby corrected as shown below:

In the Claims,

In claim 1, column 15, line 34, insert --, by the user device,-- after the word "selecting"

In claim 1, column 15, line 35, insert --and material covered in one or more of the displayed portions-- after the word "behavior"

In claim 1, column 15, line 37, insert --, by the user device,-- after the word "providing"

In claim 2, column 15, line 42, insert --of the-- after the word "more"

In claim 3, column 15, line 50, insert --the-- after the word "suggesting"

In claim 7, column 16, line 5, delete "includes the following" and insert --comprises--

In claim 7, column 16, line 9, insert --, wherein the problem is selected based at least in part on how fast the user reads the portions and at least in part on which of the portions the user finished reading-- after the word "reading"

In claim 10, column 16, lines 23-24, delete "for a studying module"

In claim 10, column 16, line 33, insert --and material covered in one or more of the displayed portions-- after the word "behavior"

In claim 11, column 16, line 40, insert --of the-- after the word "more"

In claim 12, column 16, line 51, insert --an-- before the word "additional"

In claim 12, column 16, line 51, delete "behaviors" and insert --behavior--

Signed and Sealed this  
Twenty-fourth Day of March, 2015

Michelle K. Lee  
*Director of the United States Patent and Trademark Office*

CERTIFICATE OF CORRECTION (continued)
U.S. Pat. No. 8,834,166 B1

In claim 12, column 16, line 51, insert --an-- after the word "and"

In claim 12, column 16, line 52, delete "behaviors" and insert --behavior--

In claim 12, column 16, line 53, insert --the-- before the word "material"

In claim 12, column 16, line 54, delete "one or more" and insert --the--

In claim 12, column 16, line 54, delete "users" and insert --user--

In claim 12, column 16, line 56, delete "behaviors" and insert --behavior--

In claim 12, column 16, line 57, delete "behaviors" and insert --behavior--

In claim 17, column 17, line 21, insert --, wherein the problem is selected based at least in part on how fast the user reads the portions and at least in part on which of the portions the user finished reading-- after the word "reading"

In claim 19, column 17, line 24, insert --non-transitory-- after "A"

In claim 19, column 17, line 27, insert --, by the processor,-- after the word "determining"

In claim 19, column 17, line 29, insert --, by the processor,-- after the word "selecting"

In claim 19, column 17, line 30, insert --and material covered in at least one of the one or more displayed portions-- after the word "behavior"

In claim 19, column 17, line 31, insert --, by the processor,-- after the word "determining"

In claim 19, column 17, line 33, insert --, by the processor,-- after the word "suggesting"

In claim 20, column 17, line 37, insert --non-transitory-- after the word "The"

In claim 21, column 18, line 1, insert --non-transitory-- after the word "The"

In claim 22, column 18, line 11, insert --non-transitory-- after the word "The"

In claim 23, column 18, line 21, insert --non-transitory-- after the word "The"

In claim 24, column 18, line 27, insert --non-transitory-- after the word "The"

In claim 25, column 18, line 40, insert --a passage of-- after the word "providing"

In claim 25, column 18, line 41, delete "and" and insert --providing a new passage of the electronic publication to the user on the user device responsive to receiving a change page command; and--

In claim 25, column 18, line 43, insert --based at least in part on the passage and a timing of the change page command-- after the word "user"